(12) United States Patent
Maeda et al.

(10) Patent No.: US 6,928,167 B1
(45) Date of Patent: Aug. 9, 2005

(54) METHOD FOR MANAGING PUBLIC KEY

(75) Inventors: Atsushi Maeda, Zama (JP); Ken Watanabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 672 days.

(21) Appl. No.: 09/585,358

(22) Filed: Jun. 2, 2000

(30) Foreign Application Priority Data

Jun. 23, 1999 (JP) .................................. 11-155322

(51) Int. Cl.$^7$ .............................. H04K 1/00; H04L 9/00
(52) U.S. Cl. ........................ 380/285; 380/282; 713/171
(58) Field of Search ............................... 380/285, 282; 709/203, 208, 212, 218, 223, 231, 249; 713/171

(56) References Cited

U.S. PATENT DOCUMENTS

| | | | |
|---|---|---|---|
| 5,109,384 A * | 4/1992 | Tseung | 714/748 |
| 5,175,765 A * | 12/1992 | Perlman | 380/30 |
| 5,422,953 A * | 6/1995 | Fischer | 713/172 |
| 5,455,865 A * | 10/1995 | Perlman | 713/153 |
| 5,790,548 A * | 8/1998 | Sistanizadeh et al. | 370/401 |
| 5,825,884 A * | 10/1998 | Zdepski et al. | 705/78 |
| 5,870,475 A * | 2/1999 | Allan et al. | 380/282 |
| 5,883,810 A * | 3/1999 | Franklin et al. | 700/232 |
| 6,023,507 A * | 2/2000 | Wookey | 709/224 |
| 6,111,883 A * | 8/2000 | Terada et al. | 370/401 |

OTHER PUBLICATIONS

Security Architecture for the Internet Protocol, R. Atkinson, Internet Engineering Task Force, Network Working Group, Nov. 1997, pp. 1-63.
Simple Key-Management for Internet Protocol, Ashar Aziz, Tom Markson, Hemma Prafullchandra, Internet Engineering Task Force, IPSEC Working Group, Aug. 14, 1996, pp. 1-34.

* cited by examiner

Primary Examiner—Justin T. Darrow
Assistant Examiner—Kambiz Zand
(74) Attorney, Agent, or Firm—Antonelli, Terry, Stout & Kraus, LLP (57) ABSTRACT

In a network having hierarchical domain names and a DNS server for managing the correspondence between the domain name and the address located at each hierarchy, each DNS server provides a module for managing a public key and a database for indicating correspondence between a public key and a domain name of the host belonging to the network. When two hosts start to do security communication with each other, one host operates to automatically acquire a public key of a target host from the function-expanded DNS. The packet for inquiring the public key contains the name of the DNS server trusted by the host. The DNS server specified by this host operates to add an electronic signature to the packet for answering the public key. The host enables to determine if the public key contained in the packet for answering the public key may be trusted on this electronic signature, thereby preventing a malignant host from feigning be a target host.

2 Claims, 6 Drawing Sheets

METHOD FOR MANAGING PUBLIC KEY

BACKGROUND OF THE INVENTION

The present invention relates to a method for managing a public key, and more particularly to the method for managing a public key which is appropriate to a public key encryption system used for keeping security of a network.

As a method of realizing security in communications through the internet, for example, an IPSEC (IP SECurity) may be referred which is a security protocol for IP (Internet Protocol) layers. A representative one of the publications on the IPSEC is [REC1825] "Security Architecture for the Internet Protocol" written by R. Atkinson and issued by IETF (Internet Engineering Task Force).

The key management protocol accompanied with the IPSEC uses the public key encryption system. As the prior art on the key management protocol, for example, the technology called SKIP has been known which is described in "Simple Key-Management For Internet Protocol" written by Ashar Aziz, Tom Markson, Hemma Prafullchandra and issued by IETF. Hereafter, the key management protocol will be described.

It is assumed that two hosts A and B are provided for executing security communications within a network and encryption communications through the use of the common key encryption system based on the IPSEC, in which the host A knows the public key of the host B, while the host B knows the public key of the host A.

In doing communications, the host A operates to combine its own secret key with the other public key for creating a key K(A) for encrypting the common key, while the host B operates in the same manner for creating a key K(B) for encrypting the common key. For example, when the host A transmits data to the host B, the host A operates to create the common key T and encrypt the data with the common key T and the common key T with the key K(A). The host A operates to insert a new header containing information on the encrypted common key T after the IP header. The host B on the receiving side operates to decrypt the encrypted common key T in the packets with its own secret key and decrypt the data of the encrypted packets with the decrypted common key T. In the security communication between the hosts A and B, the common key for encrypting the data is periodically updated.

The conventional key management protocol accompanied with the IPSEC requires the two hosts for doing the security communication with each other to know the other's public key before starting the communication.

The aforementioned conventional method does not have a method for automatically and safely exchanging the public key between the two hosts that try to do the security communication before starting the communication. It means that for exchanging the public key one public key has to be given to the other host by hands, which disadvantageously makes the management of the public key more complicated. Further, if the network is configured in larger scale, this prior art has a disadvantage that it puts a greater burden on a manager of the network.

As another disadvantage, if the public key unaccompanied with authentication on the network is distributed, the foregoing prior art cannot prevent a malignant host from being feigned to be a proper target host of the security communication.

SUMMARY OF THE INVENTION

It is an object of the present invention to provide a method for managing a public key which is arranged to overcome the foregoing disadvantages the prior art involves and allow the two hosts that try to do the security communication to automatically and safely exchange the public keys with each other before starting the communication.

According to an aspect of the invention, the object may be achieved as follows. A public key management system is provided in which the system includes a hierarchical network with a domain name at each layer, a DNS server provided at each layer for managing the correspondence between the domain name and the address, and a host held in the network itself, the DNS server serving to distribute a public key of another host to the hosts belonging to the network. The DNS server includes means for managing the public key and a database for storing the public key of the host belonging to the network and its domain name in a corresponding manner. When an inquiry of the public key of the second host through the information of the domain name is given to the network by the first host, the means for managing a public key is served to refer to the database so that the information about the public key of the second host corresponding to the domain name is given to the first host.

Further, the foregoing object may be achieved as follows. When the DNS server receives an inquiry of the public key of the second host from the first host, if no entry corresponding to the domain name of inquiry is found in the database included in the DNS server, the solution of the public key is recursively entrusted to another DNS server provided with the corresponding means for managing a public key and a database along each layer of the domain name.

Further, the foregoing object may be achieved as follows. The host provides means for inquiring the public key of another host of the DNS server. When the security communication is started, the inquiry about the corresponding public key to the domain name of the target host is given to the means for inquiring the public key provided in the DNS server.

The object of the invention may be achieved by providing the following means except the configuration having the foregoing means.

That is, if the configuration of the network is changed, the foregoing object is achieved by some DNS servers relevant to the change of the configuration serving to update the database for storing the public key of the host and the domain name in a corresponding manner and the other DNS servers serving not to update the database.

Further, the foregoing object may be achieved by providing means for processing an electric signature in the DNS server having the means for managing a public key and the database and in means for inquiring the public key, adding the electronic signature to the packet outputted for inquiring the public key and answering the inquiry, making sure of the electronic signature of the inputted packet with the electronic signature, and discarding the interpolated packets, for preventing the content of the packets from being interpolated.

Moreover, the foregoing object may be achieved by the DNS server having the means for managing a public key and the database for inquiring the public key and answering to it and the host having means for inquiring the public key, both of the DNS server and the host using the same format for the packets as the conventional DNS packets.

The foregoing object may be achieved by, before answering the information of the public key containing the information about the domain name of the DNS server trusted by the host contained in the packets for inquiring the public key transmitted by the host to the DNS server, prompting the means for managing a public key of the DNS server to request an electronic signature of the DNS server trusted by the host indicated in the packets for inquiring the public key, prompting the means for managing a public key of the DNS server having received the request of the electronic signature to add an electronic signature to the packets for answering the public key, prompting the means for processing the electronic signature of the host to determine if the information of the public key contained in the packet for answering the public key is trusted on the electronic signature, thereby preventing a malignant host from being feigned to correspond its own public key and address with the domain name of inquiry contained in the packet for inquiring the public key.

The foregoing object may be achieved by, when the DNS server having received the request for the electronic signature is different from the DNS server trusted by the host indicated in the packet for inquiring the public key, prompting the means for managing a public key of the DNS server to request the DNS server on the upper layer of the electronic signature for the packet for answering the public key along the hierarchical structure of the domain name, and prompting the DNS server trusted by the host indicated in the packet for inquiring the public key to add the electronic signature to the packet for answering the public key.

The foregoing object may be achieved by prompting the means for inquiring the public key provided in the host to select the trusted DNS server according to the domain name of inquiry and thereby decreasing the number of the DNS servers for adding an electronic signature to the packet for answering the public key containing the information about the domain name of the DNS server, thereby making the acquisition of the public key more efficient.

The foregoing object may be achieved by caching the information of a public key, an electronic signature and a domain name of the server to which the electronic signature has been added, contained in the packets for answering the public key with the electronic signature in means for managing a public key of the DNS server having received the response of the public key with the electronic signature, thereby preventing a wasteful burden from being put on the network and the server and making the acquisition of the public key more efficient.

As mentioned above, the DNS served as means for solving the correspondence between the domain name and the address of the network operates to expand the function of the DNS server served as realizing the DNS and provides means for solving the correspondence between the domain name and the public key. The method for realizing the DNS will be described in [REF1035] "Domain Names—Implementation and Specifications" written by P. Mockapetris and issued by IETF.

According to the invention, the function-expanded DNS server having the means for managing a public key and a database for storing a public key and a domain name of the host belonging to the network in a corresponding manner operates to answer the public key corresponding to the domain name of inquiry to the host by prompting the means for managing the public key to respond the database when the inquiry of the public key is received from the host through the information of the domain name. When the two hosts on the network start the security communication, one host operates to automatically acquire the corresponding public key to the domain name of the target host, thereby making the management of the public key in the network easier.

According to the invention, the name of the DNS server trusted by the host is contained in the packet for inquiring the public key and the electronic signature is added to the packet for answering the public key by the DNS server trusted by this host. Hence, the host enables to determines if the public key contained in the packets for answering the public key may be trusted, thereby preventing a malignant host from being feigned to correspond its own public key and address with the domain name of inquiry, that is, being passed off as the target host for the security communication. The foregoing function-expanded DNS server is served to add the electronic signature to all the packets to be transferred for acquiring the public key, thereby preventing the content of the packets from being interpolated.

DESCRIPTION OF THE EMBODIMENTS

Hereafter, the description will be oriented to a system for managing a public key according to an embodiment of the present invention with reference to the appended drawings.

Figure 1:
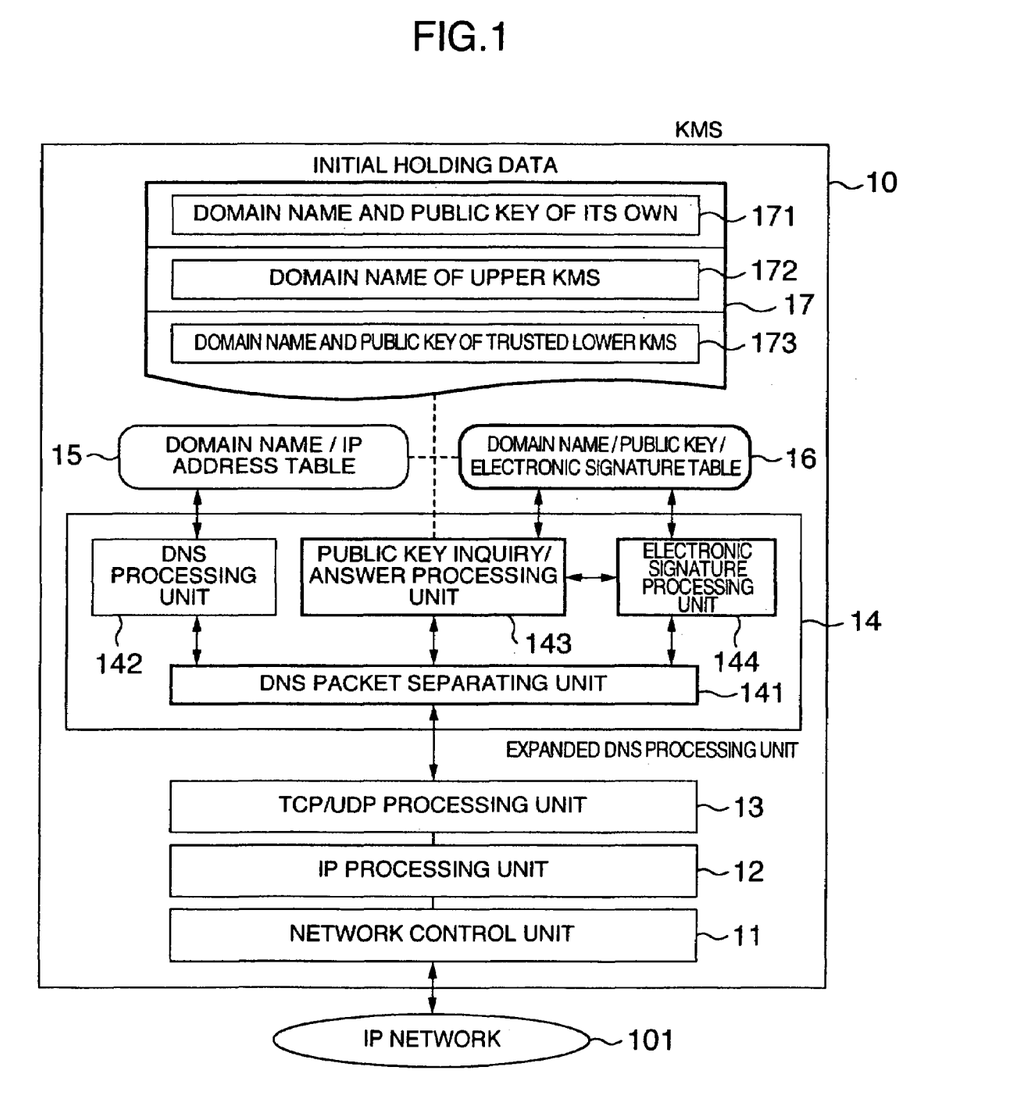
FIG. 1 is a block diagram showing a configuration of a KMS (Key Management Server) according to an embodiment of the present invention.
Figure 2:
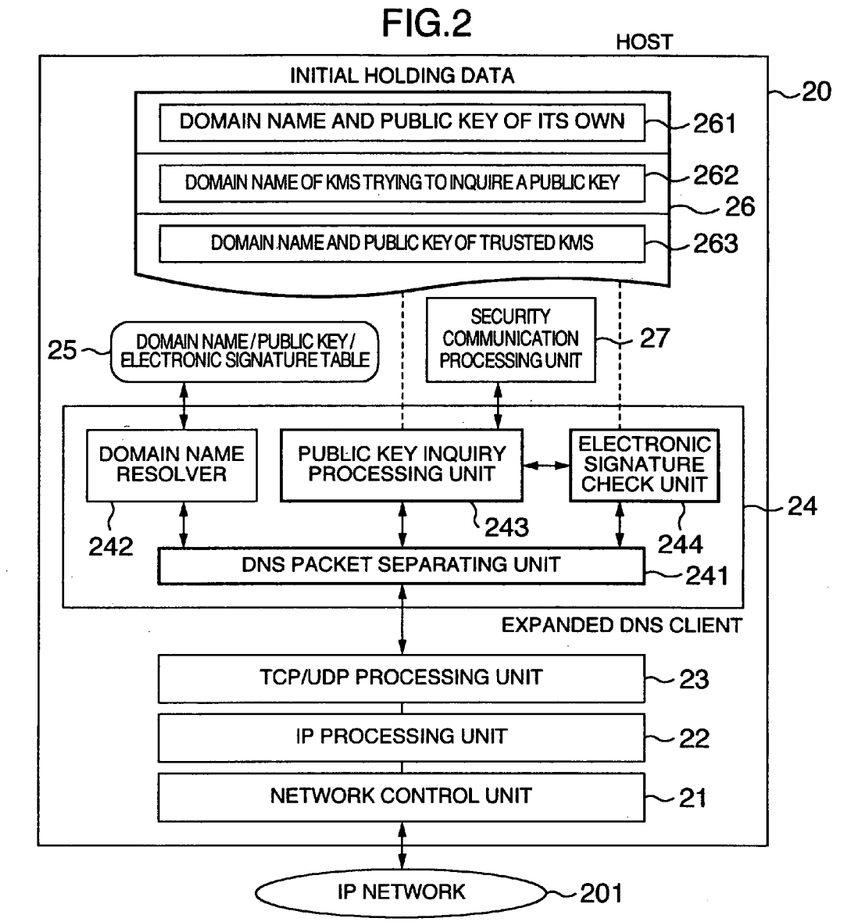
FIG. 2 is a block diagram showing a configuration of a host having a function as a DNS client in the foregoing embodiment.
Figure 3:
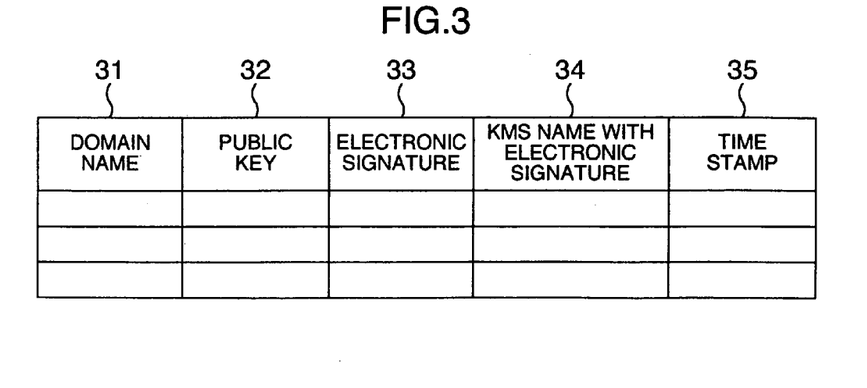
FIG. 3 is a table showing a composition of a table for describing correspondence between a public key and a domain name in the foregoing embodiment.
Figure 4:
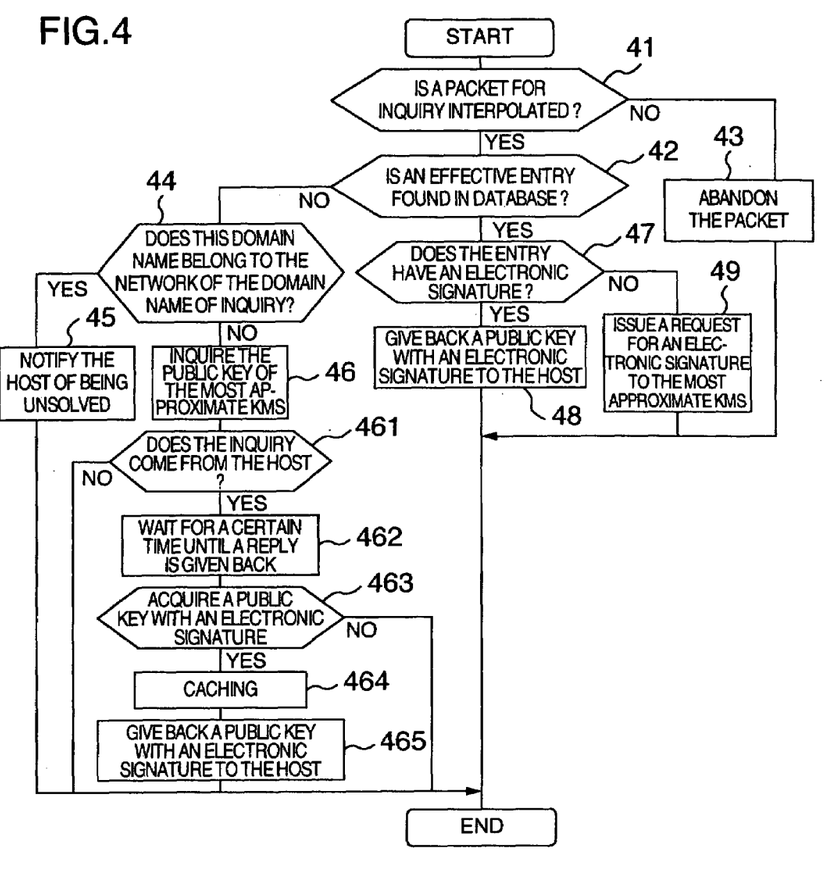
FIG. 4 is a flowchart for describing a routine for answering a public key when a DNS server receives an inquiry of the public key.
Figure 5:
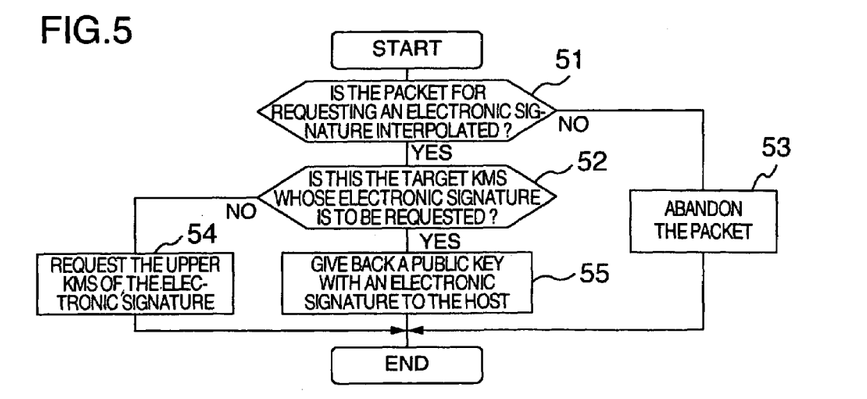
FIG. 5 is a flowchart for describing a routine for adding an electronic signature to the packets for answering the public key when the DNS server receives the request of the electronic signature.
Figure 6:
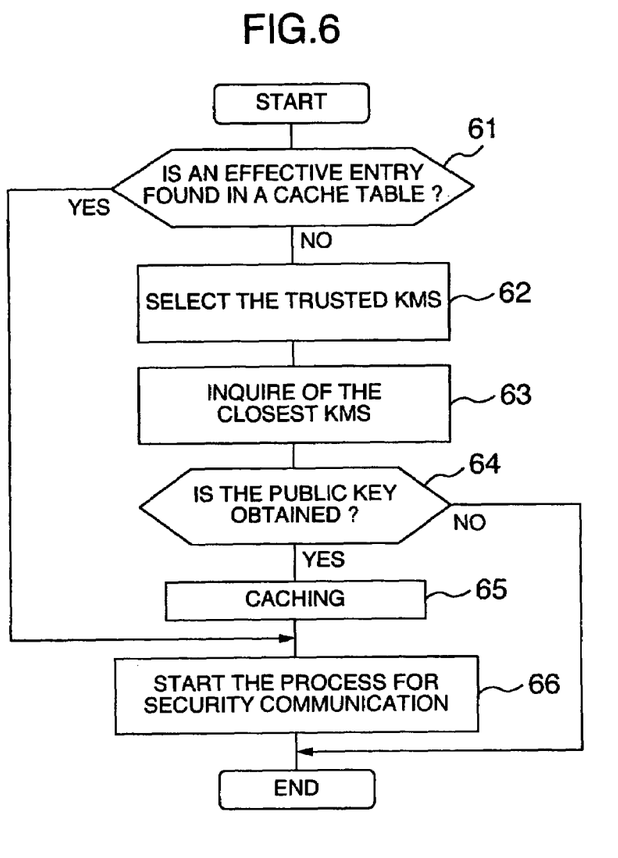
FIG. 6 is a flowchart for describing a routine in which the host having a function of the DNS client acquires the public key of the target host.
Figure 7:
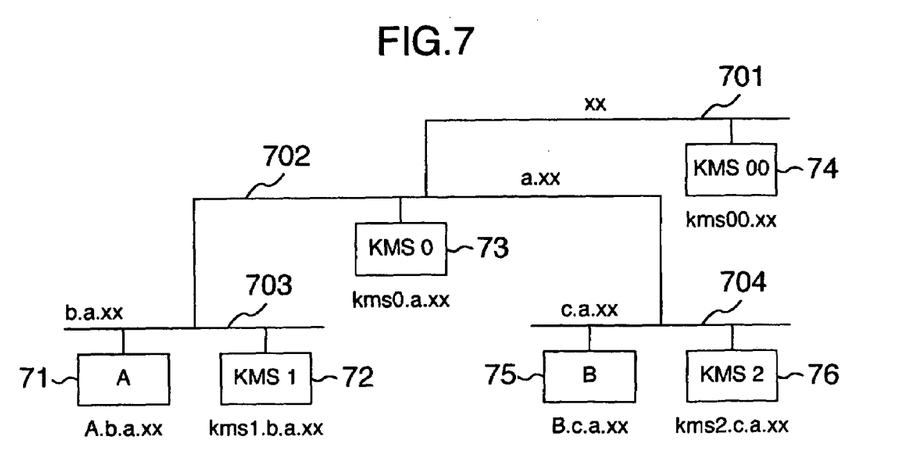
FIG. 7 is a block diagram showing the application of the invention to the network having a hierarchical structure of a domain name.
Figure 8:
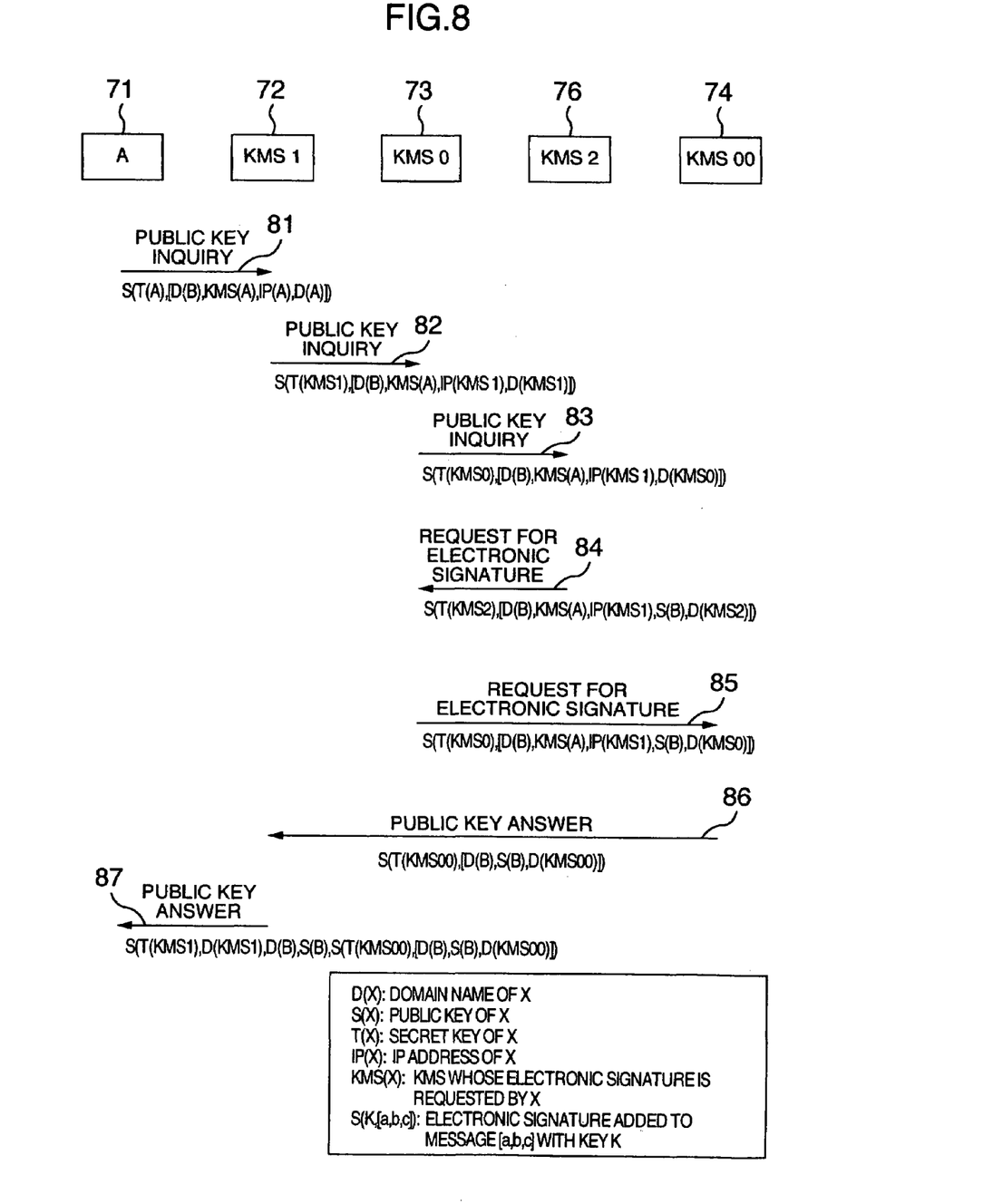
FIG. 8 is a view for describing types of packets to be transferred between the host and the KMS and between the KMS and the KMS and electronic signatures added thereto in the routine in which the host acquires the public key of the target host.
Figure 9:
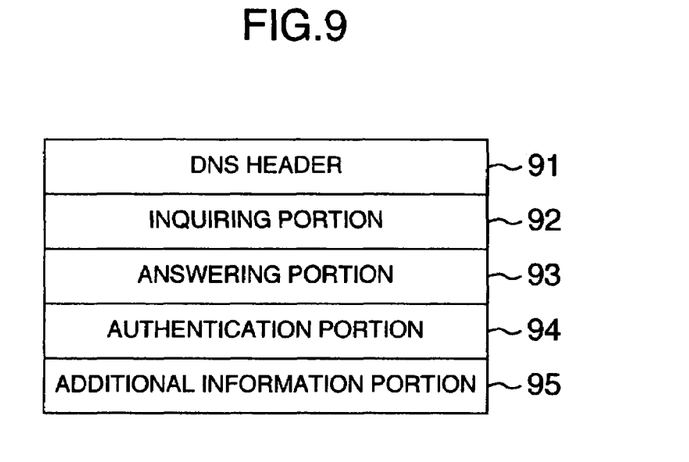
FIG. 9 is a view for describing the composition of the format of the DNS packets.
Figure 10:
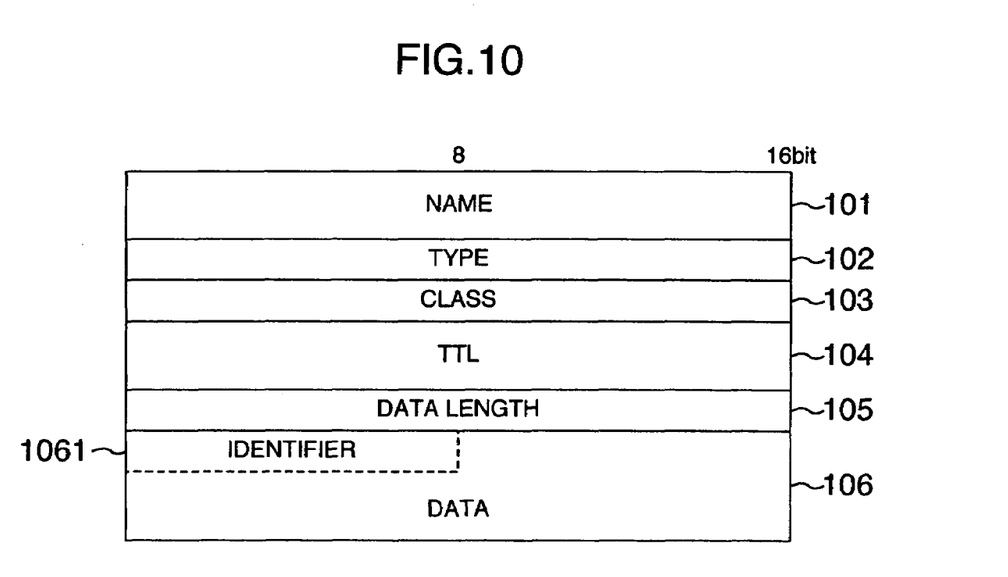
FIG. 10 is a view for describing the composition of the format of a resource record contained in the DNS packets.

FIG. 1 is a block diagram showing a configuration of a KMS (Key Management Server) included in a system for managing a public key according to an embodiment of the present invention. FIG. 2 is a block diagram showing a configuration of a host having a function as a DNS client. The KMS is a server having an expanded function of the DNS server. Likewise, the host has a function as the function-expanded DNS client. FIG. 3 shows the composition of the table for describing the correspondence between the public key and the domain name. FIG. 4 is a flowchart for describing the routine in which the DNS server answers the public key when it receives an inquiry of the public key. FIG. 5 is a flowchart for describing the routine in which the electronic signature is added to the packet for answering the public key when the DNS server receives an inquiry of the electronic signature. FIG. 6 is a flowchart for describing the routine in which the host having a function of the DNS client acquires the open key of the target host. FIG. 7 is a block diagram showing the application of the invention to the network having the hierarchical structure of the domain name. FIG. 8 is an explanatory view showing the types of packets to be transferred between the host and the EMS and between the EMS and the KMS and the electronic signatures added thereto. FIG. 9 is an explanatory view showing the composition of the format of the DNS packet. FIG. 10 is an explanatory view showing the composition of the format of a resource record contained in the DNS packet. In the Figs., numerals 10 and 20 each denotes a KMS. Numerals 11 and 21 denote network control units. Numerals 12 and 22 denote IP processing units. Numerals 13 and 23 denote TCP/UDP processing units. A numeral 14 denotes an expanded DNS processing unit. A numeral 15 denotes a domain name/IP address table. Numerals 16 and 25 denote domain name/public key/electronic signature table. Numerals 17 and 26 denote initial holding data. A numeral 24 denotes an expanded DNS client. A numeral 27 denotes a security communication processing unit. A numeral 101 denotes a network. Numerals 141 and 241 denote DNS packet separating units. A numeral 142 denotes a DNS processing unit. A numeral 143 denotes a public key inquiry/answering unit. A numeral 144 denotes an electronic signature processing unit. A numeral 242 denotes a domain name resolver. A numeral 243 denotes a public key inquiry processor. A numeral 244 denotes an electronic signature processing unit. Numerals 71 and 75 denote hosts A and B. Numerals 72 to 74 and 76 denote KMS's.

At first, the configuration of the overall network system and the flow of the processing to which the present invention may be applied will be described with reference to FIG. 7.

In the network system shown in FIG. 7, the network has a hierarchical structure, each hierarchy layer of which is given a domain name. Each layer with its own domain has one KMS. Herein, consider that the host A71 acquires the public key of the host B 75. In this case, the host A 71 inquires the KMS1 (72) located in the hierarchy of the same domain of the public key of the host B 75. At this time, merely by receiving the data of the public key of the host B 75, it is impossible to prevent a malignant host from being feigned to be the host B 75.

Hence, the host A 71 requests the electronic signature of the KMS to be trusted. The KMS trusted by the host A 71 is made to be the KMS00 (74). Further, the public key of the KMS00 (74) is known to the host A 71 as well as the other hosts and is authenticated to all the hosts.

When the host A 71 requests the data on the public key of the host B 75, if the KMS1 (72) has the key on the public key of the host B 75 in response to this request, the KMS 00 KMS00 (74) trusted by the host A 71 is requested to add the electronic signature to the data on the public key. On the other hand, if the KMS1 (72) does not have the data on the public key of the host B 75, the KMS1 (72) inquires the upper KMS0 (73). In this case, the inquiry to the upper KMS is recursively continued until the KMS1 (72) reaches the KMS having the data on the public key of the host B 75. The KMS having the data on the public key of the host B 75 serves to request the KMS00 (74) to add the electronic signature in response to the inquiry from the KMS1 (72).

The KMS00 (74) requested to add the electronic signature operates to give back the data on the public key of the host B 75 to the KMS1 (72). The KMS1 (72) operates to give back the data on the public key of the host B 75 to the host A 71. In this case, the host A 71 operates to determine if the data is to be trusted because it originally knows the public key of the KMS00 (74).

The foregoing series of processes make it possible for the host A 71 to safely acquire the open key of the host B 75. The use of the public key therefore makes it possible to do the security communication with the host B 75.

In turn, the description will be oriented to the composition of the format of the DNS packet and the composition of the format of the resource record contained in the DNS packet.

As shown in FIG. 9, the DNS packet is made up of a DNS header 91, an inquiry portion 92, a reply portion 93, an authorization portion 94 representing a name of a name server with authorization, and an additional information portion 95 having plural resource records. As shown in FIG. 10, a TXT record, which corresponds to one of the resource records contained in the DNS packet, is made up of a name field 101, a TYPE field 102, a CLASS field 103, a TTL field 104 for indicating an interval of time when the resource record is cached without being discarded, a data length field 105, and a data field 106.

The resource records may be identified by TYPE. In this embodiment, the public key inquiry information and the public key answer information are put into the resource record with TYPE=16 called TXT record in the DNS resource records. In this embodiment, an identifier field 1061 is provided at the head of the data field 106 of the resource record to which the public key inquiry information and the public key answer information are to be put. This identifier field is served to distinguish the records, concretely, the public key inquiry/answer, the electronic signature request, or the normal TXT record.

The TXT record is described in the aforementioned literature about the DNS. In addition, the resource record may include an A record (TYPE=1) for indicating correspondence between an address and a domain name, and a MX record (TYPE=15) for indicating a domain name of a main exchanger, and so forth in addition to the foregoing TXT record.

In turn, the description will be oriented to the configuration of the KMS which corresponds to the server according to this embodiment of the invention with reference to FIG. 1. In FIG. 1, a real line connecting the blocks with each other indicates how the packets are transferred. A broken line indicates the reference to data.

The KMS 10 is configured to have a network control unit 11, an IP processing unit 12, a TCP/UDP processing unit 13, an expanded DNS processing unit 14, a domain name/IP address table 15, a domain name/public key/electronic signature table 16, and initial holding data 17. The KMS 10 is connected to a network 101 through the network control unit 11. The expanded DNS processing unit 14 is configured to have a DNS packet separating unit 141, a DNS processing unit 142, a public key inquiry/answer processing unit 143, and an electronic signature processing unit 144.

As stated above, the network processing unit 11 connects the KMS 10 with the IP network 101. The IP processing unit 12 is located upward of the network control unit 11 and operates to transfer the packets according to the IP (Internet Protocol). The TCP/UDP processing unit 13 is located upward of the IP processing unit 12 and operates to transfer the packets according to the TCP/UDP (Transmission Control Protocol/User Datagram Protocol). In particular, when a packet with a socket number allocated to the DNS is received, the TCP/UDP processing unit 13 operates to send the packet to the expanded DNS processing unit 14. Conversely, the expanded DNS processing unit 14 operates to send the packet generated by itself to the TCP/UDP processing unit 13.

The DNS packet separating unit 141 provided in the expanded DNS processing unit 14 operates to receive the DNS packet from the TCP/UDP processing unit 13 and separate the DNS packet into any one of the DNS processing unit 142, the public key inquiry/answer processing unit 143, and the electronic signature processing unit 144 by checking the identifier 1061 shown in FIG. 10. The DNS processing unit 142 operates to receive the conventional DNS packet from the TCP/UDP processing unit 13 and retrieve the domain name/IP address table or add an entry to the table. The domain name/IP address table is a database for storing the domain name and the IP address in the corresponding manner. When the public key inquiry/answer processing 143 receives the inquiry of the public key from another KMS from the TCP/UDP processing unit 13 in the format of the expanded DNS packet, the public key inquiry/answer processing unit 143 operates to retrieve the domain name/public key/electronic signature table 16 for storing the domain name and the public key in the corresponding manner, for the purpose of acquiring the public key of the domain name of inquiry.

The domain Name/Public Key/Electronic Signature Table 16, as shown in FIG. 3, contains a domain name 31, a public key 32, an electronic signature 33 added by the KMS trusted by the host, a KMS name 34 of the KMS having added the signature, and a time stamp 35 for indicating a time point of creating an entry. If an entry is given to the table 16, the public key inquiry/answer processing unit 143 operates to issue a request for an electronic signature to another KMS according to the inquiry request or the electronic signature processing unit 144 operates to add an electronic signature to the answer packets for the public key. If no entry is given to the table, the public key inquiry/answer processing unit 143 operates to transmit the packets for inquiring the public key of the domain name of inquiry to another KMS through the TCP/UDP processing unit 13. The electronic signature processing unit 144 operates to issue a request for an electronic signature to another EMS according to the inquiry request or add an electronic signature to the answer packets of the public key when the unit 144 receives the request for an electronic signature from another KMS in the format of the expanded KMS packet from the TCP/UDP processing unit 13.

Further, the KMS 10 holds the initial holding data 17. The initial holding data 17 is made up of a domain name/public key 171 of its own, a domain name 172 of the upper KMS in the parentage of the DNS, and a domain name/public key 173 of the trusted KMS located downward in the parentage of the DNS. The KMS 10 operates to reference the data when it goes to another KMS for inquiring the public key.

In turn, the description will be oriented to the configuration of the host having a function of the expanded DNS client according to the invention with reference to FIG. 2.

The host 20 is configured to have a network control unit 21, an IP processing unit 22, a TCP/UDP processing unit 23, an expanded DNS client 24, a domain name/public key/electronic signature table 25, initial holding data 26, and a security communication processing unit 27 and is connected to the IP network 201 through the network control unit 21.

The expanded DNS client 24 is made up of a DNS packet separating unit 241, a domain name resolver 242, a public key inquiry processing unit 243, and an electronic signature check unit 244.

As stated before, like the KMS, the host 20 includes the network control unit 21, the IP processing unit 22, and the TCP/UDP processing unit 23 and is connected to the IP network 201. When the TCP/UDP processing unit 23 receives the packet having a socket number allocated to the DNS, the unit 23 operates to transmit the packet to the expanded DNS client 24. Conversely, when the expanded DNS client 24 transmits the packet generated by itself, the client 24 operates to transmit the packet to the TCP/UDP processing unit 23.

The DNS packet separating unit 241 included in the expanded DNS client 24 receives the DNS packet from the TCP/UDP processing unit 23, check the content of the DNS header, and then separate it into the domain name resolver 242 or the public key inquiry processing unit 243. Like the conventional DNS client, the domain name resolver 242 performs a process of solving the IP address for the domain name. When inquiring the IP address for the domain name, the domain name resolver 242 operates to transmit the packet of inquiry through the TCP/UDP processing unit 23. The domain name solver 242 operates to receive the answer for the inquiry through the TCP/UDP processing unit 23.

The public key inquiry processing unit 243, which is a newly added module in this invention, performs a process of solving the public key for the domain name. The public key inquiry processing unit 243 operates to store the newly obtained information on the public key in the domain name/public key/electronic signature table 25, to which it refers before inquiring the public key for the next time. The electronic signature check unit 244 operates to refer to the domain name/public key 263 of the trusted KMS of the initial holding data 26 about the information on the public key received by the public key inquiry processing unit 243 and then determine if the electronic signature added to the information on the public key is obtained by the trusted KMS and check if the information on the public key may be trusted.

The public key inquiry processing unit 243 operates to select the most approximate trusted KMS of the domain name/public key 263 of the trusted KMS according to the domain name for inquiring the public key. The host 20 includes its own domain name/public key 261 and the domain name 262 of the upper KMS in the initial holding data 26. The public key inquiry processing unit 243 operates to refer to its own domain name/public key 261 and the domain name 262 of the upper KMS. The security communication processing unit 27 operates to do security communication based on the public key of the target host obtained by the public key inquiry processing unit 243 according to the conventional method.

In turn, the description will be oriented to the routine in which the host obtains the public key of the target host in the network shown in FIG. 7 in the case of applying the present invention to the network having a hierarchical domain name structure with reference to the flowchart shown in FIG. 4 and FIG. 8 for indicating the types of the packets to be transferred between the host and the KMS and between the KMS and the KMS and the electronic signatures to be added to the packets.

In FIG. 7, KMS0 (73), KMS1 (72), KMS2 (76), and KMS00 (74) are the KMS having the structure described with reference to FIG. 1. The hosts A 71 and B 75 are the hosts having a function of the expanded DNS client having the configuration shown in FIG. 2. Then, the KMS00 (74) is connected to the network 701 having a domain name xx. The KMS0 (73) is connected to the network 702 having a domain name a.xx. The hosts A 71 and KMS1 (72) are connected to the network 703 having a domain name b.a.xx. The hosts B 75 and the KMS2 (76) are connected to the network 704 having a domain name c.a.xx.

The domain name has a hierarchical structure, in which each KMS is served as the conventional DNS server. FIG. 8 shows the operation of each KMS if only the KMS2 (76) has the information on the public key of the host B 75. Each arrow shown in FIG. 8 shows the packets to be transferred between the host and the KMS and between the KMS and the KMS and the format of the electronic signature to be added to the packet when the host A 71 obtains the public key of the host B 75. The types of the packets include a public key inquiry, an electronic signature request, and a public key answer.

As represented by the symbols in the square of FIG. 8, the concrete content of the electronic signature is defined as follows.

S(K, [a, b, c]): Electronic signature given to message [a, b, c] by a key K
D(X): Domain name of X
S(X): Public key of X
T(X): Secret key of X
IP(X): IP address of X
KMS(X): KMS whose electronic signature is requested by X Later, the flow of FIG. 4 will be described on the assumption that the KMS whose electronic signature is requested by the host A71 is KMS00 (74).

(1) At first, the host A operates to transmit 25 the packet for inquiring the public key of the host B 75 to the KMS1 (72). As indicated by an arrow 81 in FIG. 8, the packet for inquiring this public key is as follows.

S(T(A), [D(B), KMS(A), IP(A), D(A)])

As will be understood from the foregoing definition, the electronic signature is given by the secret key of the host A to the message made up of the domain name of the host B, the KMS whose electronic signature is requested by the host A, the 12 address of the host A, and the domain name of the host A. When the KMS1 (72) receives the packet for inquiring the public key of the host B 75 from the host A 71, the electronic signature processing unit 144 shown in FIG. 1 operates to check the electronic signature added to the packet. The electronic signature processing unit 144 operates to pick up the public key of the host A 71 from the domain name/public key/electronic signature table 16 and determine if the content of the packet is interpolated through the use of the public key (step 41).

(2) If the inquiring packet is interpolated in the determination at the step 41, the KMS1 (72) abandons the packet and then terminates the process. Unless the inquiring packet is interpolated, the public key inquiry/answer processing unit 143 shown in FIG. 1 is operated to check if an entry is given in the domain name/public key/electronic signature table 16 about the domain name of inquiry. Herein, if it is determined that more than a certain time is passed by referring to the time stamp, it is assumed as an effective entry (steps 43 and 42).

(3) If no entry is found in the domain name/public key/electronic signature table 16 in the determination at the step 42, the public key inquiry/answer processing unit 143 of the KMS1 (72) shown in FIG. 7 determines if the domain name of the host of inquiry is matched to the name of the network to which the host belongs and the domain name of the KMS1 (72) is matched to the name of the network to which the KMS1 (72) belongs. For example, in FIG. 7, if the host of inquiry is B 75, the domain name c.a.xx of the network to which B 75 belongs does not coincide with the domain name b.a.xx of the network to which KMS1 (72) belongs (step 44).

(4) If the names of the network coincide with each other in the determination at the step 44, the KMS1 (72) shown in FIG. 7 notifies the host A71 of the fact that the public key to the host B is unsolved (step 45).

(5) If the names of the networks do not coincide with each other in the determination at the step 44, the KMS1 (72) operates to check the inquiring destination by referring to the domain name 172 of the upper KMS held in the initial holding data 17 in FIG. 1 and then inquire the KMS0 (73) of the public key of the host B 75. The inquiring packet is, as shown by an arrow 82 in FIG. 8, as follows.

S(T(KMS1), [D(B), KMS(A), IP(KMS1), D(KMS1)])

The message is made up of the domain name of the host B 75, the domain name of the EMS whose electronic signature is requested by the host A 71, the IP address of the KMS1 (72), and the domain name of the KMS1 (72) with addition of an electronic signature whose key is the secret key of the KMS1 (72). The addition of the electronic signature serves to prevent malignant interpolation of the inquiring packet by adding the electronic signature (step 46).

(6) Then, The KMS1 (72) determines if an inquirer of a public key to the KMS1 (72) is a host or another KMS from a start-point IP address of the packet for inquiring the public key. If another KMS inquires the public key, the process is terminated (step 461).

(7) If at the step 461 an inquirer of a public key to the KMS1 (72) is a host, the public key inquiry/answer processing unit 143 waits for a certain interval of time until the answer to the public key comes from the upper KMS. If no answer to the public key comes within a certain interval of time and no public key with an electronic signature added thereto can be obtained, the process is terminated (steps 462, 463).

(8) If the answer to the public key with the electronic signature comes within a certain interval of time, the public key inquiry/answer processing unit 143 operates to cache the public key in the domain name/public key/electronic signature table 16 shown in FIG. 1. By doing such caching, if another host inquires a public key about the same domain name, the public key inquiry/answer processing unit 143 does not need to inquire another KMS of the public key again, which makes the process of solving the public key more efficient (step 464).

(9) Next, the public key inquiry/answer processing unit 143, as shown by an arrow 87 in FIG. 8, gives back the public key answer packet with its own electronic signature to the host having received the inquiry of the public key. The public key answer packet with the electronic signature has as a message D(KMS1), D(B), S(B), S(T(KMS00)), [D(B), S(B), D(KMS00)] and as a signature key a secret key T(KMS1) (step 465).

(10) If an entry is found in the domain name/public key/electronic signature table 16 in the search for the database at the step 42, the public key inquiry/answer processing unit 143 shown in FIG. 1 operates to check if the entry has an electronic signature of the specified KMS (step 47).

(11) If an entry is added to the electronic signature of the specified KMS in the check at the step 47, the public key inquiry/answer processing unit 143 gives the public key with the electronic signature in the entry back to the host A 71 (step 48).

(12) On the other hand, if the entry has no electronic signature of the specified KMS at the step 47, the public key inquiry/answer processing unit 143 operates to check the KMS trusted by the host A 71 and added to the packet and the domain name 172 of the upper KMS of the initial holding data shown in FIG. 1. Then, the unit 143 operates to issue a request for an electronic signature to the EMSO (73) shown in FIG. 7 (arrow 83, FIG. 8).

If the KMS2 (76) has information on the public key of the host B 75 and issues a request for an electronic signature to the KMS0 (73), as shown by an arrow 84 in FIG. 8, with [D(B), KMS(A), IP(KMS1), S(B) and D(KMS2)] as a message, the request with the electronic signature whose key is a secret key of KMS2 (76) is given (step 49).

As stated before, the description has concerned with the operation of KMS1 (72) in FIG. 7. The other KMS0 (73) and KMS2 (76) are operated in the similar manner to the KMS1 (72).

In turn, the description will be oriented to the request and the answer for the electronic signature in the operation of each unit of the KMS shown in FIG. 1 with reference to the flow of FIG. 5 and FIGS. 7 and 8.

(1) Now, it is assumed that the KMS0 (73) shown in FIG. 7 has received the request for an electronic signature from the KMS1 (72). In this case, the KMS0 (73) operates the electronic signature processing unit 144 within the device having the configuration shown in FIG. 1 and then checks for the electronic signature added to the packet. The electronic signature processing unit 144 operates to pick up the public key of the KMS 172 form the domain name/public key/electronic signature table 16 and determine if the content of the packet is interpolated (step 51).

(2) In the determination at the step 51, if the content of the packet is interpolated, the electronic signature processing unit 144 operates to abandon the packet and then the KMS0 (73) terminates the process (step 53).

(3) In the determination at the step 51, if the content of the packet is not interpolated, the electronic signature processing unit 144 operates to determine if the request for the electronic signature is directed for the KMS0 (73) itself by checking the content of the packet (step 52).

(4) In the determination at the step 52, if the request for the electronic signature is not directed for the KMS0 (73), the electronic signature processing unit 144 operates to refer to the domain name 172 of the upper KMS in the initial holding data and then issue the request for an electronic signature to the upper KMS. In FIG. 7, if the KMS whose electronic signature is requested by the host A 71 is KMS00 (74), as shown by an arrow 85 in FIG. 8, the packet for requesting an electronic signature given from the KMS0 (73) to the KMS00 (74) has an electronic signature whose key is the secret key of the KMS0 (73) with [D(B), KMS(A), IP(KMS1), S(B) and D(KMS0)] as a message (step 54).

(5) On the other hand, in the determination at the step 52, if the request for the electronic signature is directed for the KMS0 (73) itself, the electronic signature processing unit 144 operates to add the electronic signature to the requested packet by using its own secret key and give back the packet with the electronic signature to the requester KMS. In the example being described now, for example, as shown by an arrow 86 of FIG. 8, the answer packet includes an electronic signature added thereto with [D(B), S(B) and D(KMS00)] as a message and the secret key of KMS00 (74) as a key (step 55).

In turn, the description will be oriented to the operation of the host having the configuration shown in FIG. 2 with reference to the flow of FIG. 6 and FIGS. 7 and 8.

(1) In FIG. 7, it is assumed that the host A 71 tries to acquire the open key of the host B 75. At this time, the open key inquiry processing unit 243 of the host A 71 having the configuration shown in FIG. 2 operates to retrieve the domain name/public key/electronic signature table 25 for checking if any entry to the host B 75 is given (step 61).

(2) At the step 61, if no entry to the host B 75 is found in the domain name/public key/electronic signature table 25, the public key inquiry processing unit 243 operates to refer to the domain name/public key 263 of the trusted KMS in the initial holding data 26 for selecting the trusted KMS. If two or more domain name/public keys 263 of the trusted KMS are found, the unit 243 operates to select the KMS that is upper than and closest to the domain name of inquiry (step 62).

(3) Next, the public key inquiry processing unit 243 operates to refer to the domain name 262 of the KMS for inquiring the pubic key in the initial hold data 26, for inquiring the KMS of the hold B 75. The packet for inquiring the public key includes an electronic signature with [D(B), KMS(A), IP(A) and D(A)] as a message and the secret key T(A) of the old A as a key (step 63).

(4) When the public key answer packet is given back in response to the inquiry at step 63, the host A 71 operates the electronic signature check unit 244 shown in FIG. 2 and then checks if the electronic signature added to the public key answer packet is given by the requested KMS and the content of the packet is interpolated (step 64).

(5) If the public key answer packet is not given back within a certain interval of time or it is checked that at the step 64 the electronic signature added to the public key answer packet is given by the requested KMS and the content of the packet is interpolated, the host A 71 terminates the process without taking any action. This makes it possible to prevent a malignant host from being feigned to be a target host of the security communication by pretending its own public key and address to correspond with the inquired domain name.

(6) If at the step 64 it is determined that the electronic signature added to the public key answer packet is given by the requested KMS and the content of the packet is not interpolated, the public key inquiry processing unit 243 operates to check the content of the public key answer packet and cache a combination of a domain name, a public key, an electronic signature, and a domain name of the KMS with the signature added thereto in the domain name/public key/electronic signature table 25 (step 65).

(7) The security communication processing unit 276 of the host A 71 operates to start the process for the security communication through the use of the public key acquired by the foregoing process or the public key found at the step 61 (step 66).

The implementation of the foregoing process by the host makes the process for solving the public key more efficient.

According to the foregoing embodiment of the invention, two hosts in the network enables to automatically acquire the corresponding public key to the domain name of the target host through the use of the function-expanded DNS server before starting the security communication. This makes it easier to manage the public key.

According to the foregoing embodiment of the invention, the DNS server specified by the host is served to add the electronic signature to the public key answer packet. This makes it possible to prevent a malignant host from being feigned to be the target host of the security communication by pretending the public key and the address of the malignant host to correspond with the domain name of inquiry.

As set forth above, according to the invention, the program for realizing the present invention is stored in the storage medium such as a FD or CD-ROM and then the program is installed in the DNS server and the host. Further, the present invention is configured to store the program for realizing the invention in the storage medium located in the information processing apparatus connected to the network and copy the program in the storage medium such as a harddisk located in the DNS server and the host through the network, for realizing the invention in the DNS server and the host.

What is claimed is:

1. A system for managing a public key in an environment having a hierarchical network with a domain name at each hierarchy, a DNS server provided at each hierarchy for managing correspondence between the domain name and an address, and hosts accommodated in the network, the DNS server serving to distribute a public key of another host to the host belonging to the network, the DNS server having means for managing the public key and a database for storing the public key of the host belonging to the network and the domain name in a corresponding manner, the method comprising:

when a first host issues an inquiry about a public key of a second host on the information about the domain name, prompting the means for managing the public key to refer to the database, thereby answering the information on the public key of the second host corresponding to the domain name to the first host, wherein when the DNS server receives an inquiry of the public key of the second host from the first host, if no entry corresponding to the domain name of inquiry is found in the database of the DNS server itself, solution of the inquiry of the public key is recursively entrusted to another DNS server provided with the another means for managing a public key and the database along the hierarchy of the domain name.

2. A system for managing a public key as claimed in claim 1, wherein the host provides means for inquiring about the DNS server of the public key of another host, the means serving to inquire about the DNS server of the corresponding public key to the domain name of a target host when a security communication is started.

* * * * *